(12) United States Patent
Blankenship et al.

(10) Patent No.: US 7,556,491 B2
(45) Date of Patent: Jul. 7, 2009

(54) HEATING PANEL AND METHOD OF HEATING

(75) Inventors: Timothy Blankenship, Kane, PA (US); Edward Constantine, Coraopolis, PA (US); Junius Himes, Smethport, PA (US); Brent Lillesand, Madison, WI (US); James Todd, Ludlow, PA (US)

(73) Assignee: Apollo Hardwoods Company, Coraopolis, PA (US)

( * ) Notice: Subject to any disclaimer, the term of this patent is extended or adjusted under 35 U.S.C. 154(b) by 197 days.

(21) Appl. No.: 11/086,767

(22) Filed: Mar. 22, 2005

(65) Prior Publication Data

US 2005/0220924 A1 Oct. 6, 2005

Related U.S. Application Data

(60) Provisional application No. 60/555,513, filed on Mar. 23, 2004.

(51) Int. Cl.
*B29C 43/52* (2006.01)
*B29C 33/02* (2006.01)

(52) U.S. Cl. .................. 425/407; 425/384; 264/320

(58) Field of Classification Search .................. None
See application file for complete search history.

(56) References Cited

U.S. PATENT DOCUMENTS 1,550,185 A * 8/1925 Steenstrup .................. 219/531

| | | | | |
|---|---|---|---|---|
| 3,181,605 A | * | 5/1965 | Smith, Jr. | ...................... 165/90 |
| 3,393,292 A | * | 7/1968 | Ritscher | ...................... 219/245 |
| 3,594,867 A | * | 7/1971 | Pfeiffer | ...................... 425/143 |
| 3,754,499 A | * | 8/1973 | Heisman et al. | ............. 100/323 |
| 3,775,033 A | * | 11/1973 | Pfeiffer | ...................... 425/520 |
| 4,398,991 A | * | 8/1983 | Thies | ...................... 156/583.1 |
| 5,421,951 A | | 6/1995 | Troutner et al. | |
| 6,253,672 B1 | | 7/2001 | Rauf et al. | |
| 6,668,714 B2 | | 12/2003 | Wollny et al. | |
| 6,745,825 B1 | * | 6/2004 | Nakamura et al. | ...... 165/104.26 |
| 2003/0136280 A1 | * | 7/2003 | Husted | ...................... 100/92 |

FOREIGN PATENT DOCUMENTS

DE 2522787 * 12/1976

* cited by examiner

*Primary Examiner*—Edmund H. Lee
(74) *Attorney, Agent, or Firm*—The Webb Law Firm

(57) ABSTRACT

A heating apparatus or platen is provided with a heating surface adjacent a heat exchange fluid area defined by the heating surface attached by side walls and end plates to a retainer plate. A flow through system pumps heat exchange fluid through a platen with holes in end plates. Optional walls partition the heat exchange fluid area into flow channels in the platen. An alternative circulating flow system circulates heat exchange fluid in a closed platen with solid end plates. A u-shaped wall and at least one internal wall create a continuous fluid flow channel inside the closed platen. Flow systems pump a heat exchange fluid through heat exchange fluid area for heating by at least one internal heating element within the platen. The temperature of the heat exchange fluid remains relatively constant as it passes through the platen from heat conduction by the internal heating elements.

7 Claims, 5 Drawing Sheets

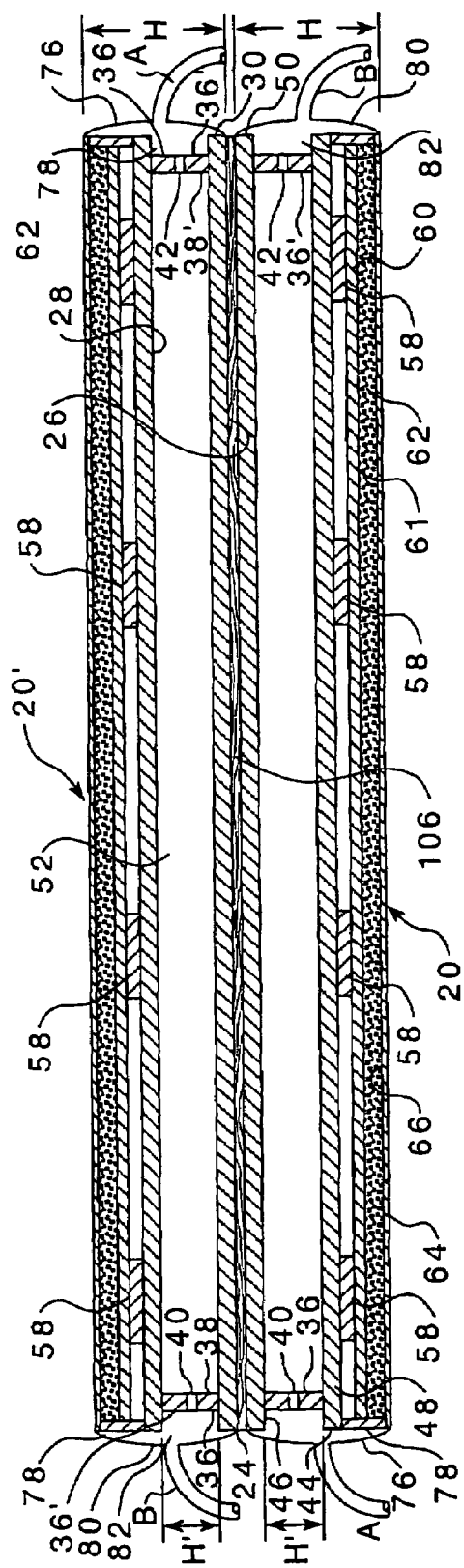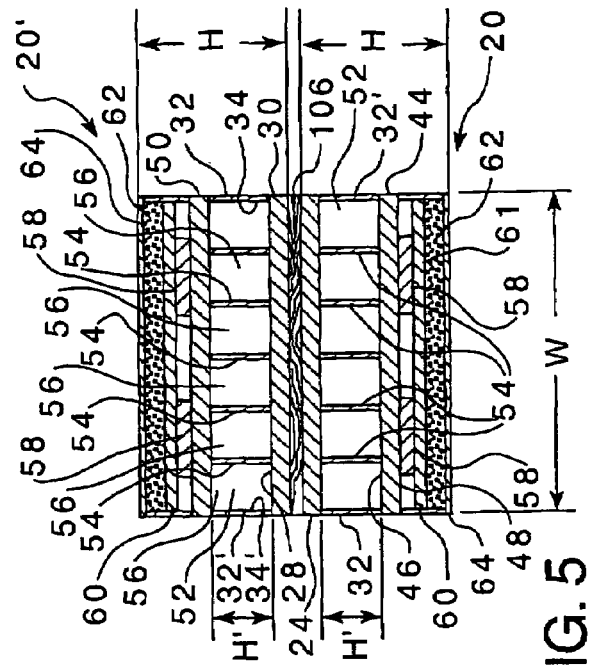

HEATING PANEL AND METHOD OF HEATING

CROSS REFERENCE TO RELATED APPLICATIONS

This application claims the benefit of U.S. Provisional Application No. 60/555,513 entitled "Heating Panel" filed Mar. 23, 2004, which is incorporated herein by reference.

BACKGROUND OF THE INVENTION

1. Field of the Invention

The present invention relates to a heating panel and method of use as a platen or other heating surface, which includes at least one internal fluid-filled channel and an internal heating source.

2. Description of Related Art

Platen presses are routinely used in the manufacture of plywood, chipboard, fiberboard and paneling. The layers or fibers of these products are hot pressed together with a binder to produce the finished panels. A platen press generally includes an upper frame and a lower frame on which heating platens are mounted. As is described in U.S. Pat. No. 5,421,951, a platen press is usually elongate with a rectangular shape and a large, flat heating surface. A standard platen is heated by means of internal narrow passages, which are drilled or otherwise formed in the internal portion of the platen and are positioned adjacent to the heating surface. These passages generally have a one-inch diameter. A heat exchange liquid in the form of oil or water, or heat exchange vapor in the form of steam, is passed through the internal network of narrow passages to provide heat, which is conducted to the heating surface of the platen.

Typically, in prior art platens, the heat exchange liquid or vapor is heated with a heating source at a location external to the platen. Following the heating at the external source, the heat exchange liquid or vapor is directed through a tube to a manifold, which directs it into the network of narrow passages at one end of the platen. During the passage of the heat exchange liquid or vapor through the network of narrow passages in the internal portion of the platen, heat is conducted to the surface of the platen. The heat exchange liquid or vapor then exits through the opposite end of the platen. Following the exit at the opposite end of the platen, the heat exchange liquid is returned to the external heating source for reheating prior to recirculation through the platen.

An inherent functional defect exists in the prior art platens, which involves the heat exchange liquid or vapor losing its temperature during passage through the platen. The loss of temperature in the heat exchange liquid or vapor flowing through the platen creates a temperature gradient that directly affects the temperature of the heat surface of the platen. The temperature gradient causes a gradual temperature drop on the surface of the platen. The temperature of the heating surface is the highest at the end where heat exchange liquid is introduced into the platen and then gradually decreases along the heating surface to the lowest temperature at the end where the heat exchange liquid exits the platen.

The prior art teaches that attempts have been made to mitigate the temperature loss by increasing the pressure and/or flow rate of the heat exchange liquid passing through the network of narrow passages in the platen. However, the improvements made in the art to address the temperature loss have not satisfactorily solved the heat loss problem. Additionally, the improvements have not solved the occurrence of undesirable, localized hot spots on the heating surface of a platen. Accordingly, there is a present need for a platen with at least one internal heating element for equilibrating the temperature of a heat exchange fluid flowing through internal channels of the platen that establishes a consistent temperature on the heat surface for pressing and/or drying operations.

SUMMARY OF THE INVENTION

The present invention provides a platen with at least one internal heating element used to equilibrate the temperature of a heat exchange fluid flowing through a heat exchange fluid area of the platen that heats the heating surface of the platen to a relatively consistent temperature.

A heat exchange fluid is passed through a heat exchange fluid area, which may be partitioned into at least two internal flow channels within the platen. As the heat exchange fluid is passed through the heat exchange fluid area optionally partitioned into internal flow channels, it is heated by several internal heating elements. The temperature of the heat exchange fluid remains relatively constant as it passes through the platen from heat conducted from the internal heating elements.

The heat exchange fluid area and optional internal flow channels of the platen are constructed to provide a wide channel or channels, respectively, through which the heat exchange fluid is passed. The width characteristic of the heat exchange fluid area with optional internal flow channels provides large surface area exposure to the heat exchange fluid for heat transfer to the platen surface. The heat exchange fluid area can be a flow through system or, alternatively, an internal circulating system based upon the internal configuration of a platen made in accordance with the invention.

Heating elements are located in a position adjacent to the internal flow channels and opposite from the heating surface of the platen. Heating elements may be alternatively located inside the heat exchange fluid area of the platen. The location of the heating elements provides a continuous heating of the heat exchange fluid as it passes through internal flow channels of the platen.

Optionally, a cooling source may be used with a flow through system for a controlled decrease in temperature of the heat exchange fluid prior to its re-entry into the heat exchange fluid area of a platen. Cooling the heat exchange fluid may be used in combination with heating the heat exchange fluid to provide varied temperatures at the heating surface of the platen.

In accordance with the invention, a method of heating a surface of a platen for treatment of a material is provided. Generally, the method comprises the steps of providing any platen of the present invention with a heat exchange fluid area filled with a fluid adjacent the surface of the platen, flowing the heat exchange fluid through the heat exchange fluid area of the platen with a flow system having a pump that corresponds with the selected platen, and heating the fluid flowing through the platen with at least one heating element within the platen. Optionally, the method includes the step of cooling the heated heat exchange fluid to a desired temperature with an external cooling mechanism prior to circulation through the heat exchange fluid area. The step of cooling the heat exchange fluid incorporates turning off heating elements.

BRIEF DESCRIPTION OF THE DRAWINGS

FIG. 4 shows a sectional side view of an inverted platen compressing a piece of plywood against a second platen in accordance with the present invention; and FIG. 5 shows a sectional end of an inverted platen compressing a piece of plywood with a second platen as shown in FIG. 4.

DESCRIPTION OF THE EMBODIMENTS OF THE INVENTION

Figure 1:
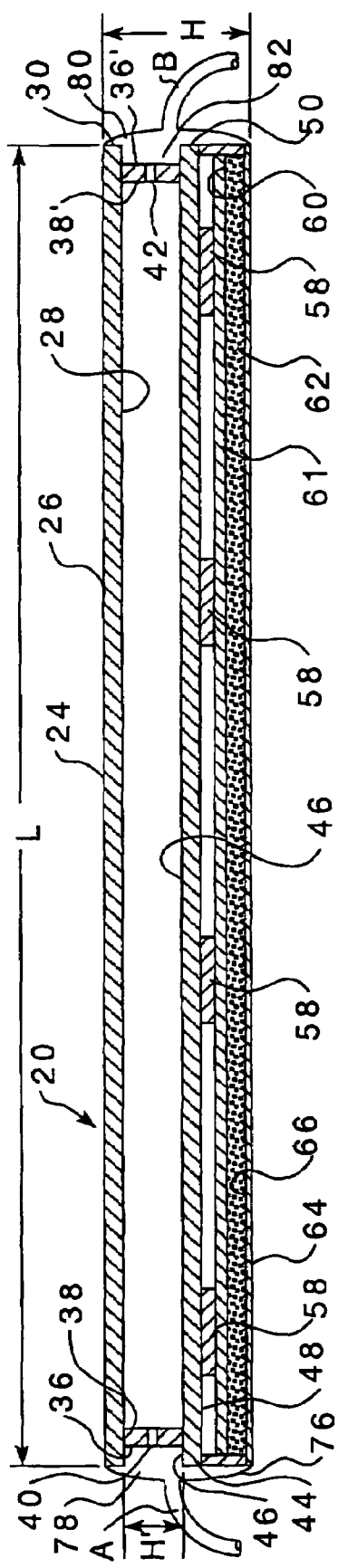
FIG. 1 shows a sectional side view of the platen made in accordance with the invention.

While this invention is satisfied by embodiments in many different forms, shown in the drawings and herein described in detail are the embodiments of the invention, with the understanding that the present disclosure is to be considered as exemplary of the principles of the invention and is not intended to limit the invention to the embodiments illustrated. Various other modifications will be apparent to and readily made by those skilled in the art without departing from the scope and spirit of the invention. The scope of the invention will be measured by the appended claims and their equivalents.

Figure 2:
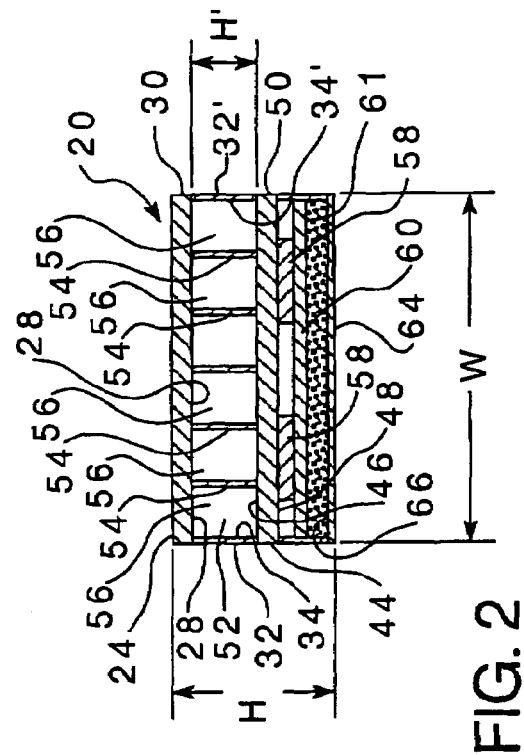
FIG. 2 shows a sectional end view of the platen shown in FIG. 1.

Referring to FIGS. 1 through 5 in which similar reference characters refer to similar parts throughout the several views thereof, a platen 20 is provided comprising top heating surface 24 connected by side channel ridges 32,32' and end plates 36,36' to a bottom retainer plate 44. Optional channel ridges 54 are attached between heating surface 24 and retainer plate 44 for a platen 20 with a flow through system 70. The use of a configuration of channel ridges 54 is a requirement for alternative platens 20" and 20''' with a circulating flow system 80. A heat exchange fluid area 52 of the platen 20 is defined by the bottom side 28 of the heating surface 24, the inner sides 34,34' of side channel ridges 32,32', the inner sides 38,38' of end plates 36,36' and the top side 46 of the retainer plate 44 as illustrated in FIGS. 2, 4 and 5. If present with a platen 20, channel ridges 54 are located within the heat exchange fluid area 52 and partition the heat exchange fluid area 52 into defined flow channels 56 of the platen 20.

Out of convenience, the word "Platen" is used in this disclosure and the claims to reference any type of heating panel and is not limited to mean only traditional platens used in the manufacture of plywood, chipboard, fiberboard and the like. Additionally, the terms "heat exchange fluid" and the word "fluid" are used in this disclosure and the claims to reference any suitable type of heat exchange fluid including steam or other vapor. Furthermore, the word "material" is used in this disclosure and the claims in reference to wood-based products, metal or any other suitable material in need of drying and/or pressing. For purposes of this disclosure, heating surface 24 of platen 20 will be referred to as the "top" of the platen shown upright in FIGS. 1 and 2. However, skilled artisans recognize that platens 20,20' are routinely used in pressing operations as illustrated in FIGS. 4 and 5 with an inverted "top" platen 20' positioned over an upright "bottom" platen 20. When using two platens 20,20' in a pressing operation, the respective inverted "top" platen 20' is an identical structure when compared to the "bottom" platen 20. Although the embodiments of the invention specifically discuss use of the platen 20 with wood-based product applications, the platen 20 may be used in any application where a uniform or controlled temperature of the heating surface 24 is necessary, such as cooking, semi-conductor manufacture, casting and molding.

Referring to FIGS. 1 through 3a, an embodiment of the platen 20 is shown with an elongate rectangular shape with dimensions of width W, length L and height H. A skilled artisan will understand that width W, length L and height H of the platen 20 are not critical so long as a sufficiently-sized heating surface 24 with a relatively consistent heating temperature is provided for heating and/or pressing an item such as a veneer 106 or other suitable material. Heating surface 24 has a top side 26, a bottom side 28 and an edge 30 with length L and width W which, when in use, is the contact surface for the item to be heated and/or pressed. Heating surface 24 is constructed of a sheet of an appropriate heat conductive material including stainless steel or other suitable material. In one embodiment, platen 20 has heating surface 24 with width W of five feet and length L of ten feet.

Referring to FIGS. 1 and 2, channel ridges 54 and side channel ridges 32,32' are configured with the platen 20. Side channel ridges 32,32' are rectangular in shape with dimensions of height H' and length L. Channel ridges 54 are rectangular in shape with dimensions of height H' and length L'. Channel ridges 54 and side channel ridges 32,32' of the platen 20 can be any square or rectangular shape, thickness, length, width or geometry. The side channel ridges 32,32' provide side walls along the length L of the platen 20 and contribute to defining heat exchange fluid areas 52 partitioned by channel ridges 54. Channel ridges 54 are configured parallel to side channel ridges 32 along length L of the platen 20. Channel ridges 54 and side channel ridges 32 may be constructed of any rigid, non-reactive material sufficient to withstand the pressures involved in the selected platen operation. In an embodiment, side channel ridges 32 are constructed of stainless steel with dimensions of height H' of nine inches and length L of ten feet. Additionally, the channel ridges 54 are constructed of stainless steel with dimensions of height H' and length L', less than ten feet. However, the dimensions of channel ridges 54 are not critical so long as the function of the channel ridges 54 is not sacrificed. Channel ridges 54 define, in part, flow channels 56 along the length L of the platen 20 configured with a flow through system 70.

Referring particularly to FIGS. 2, 4 and 5, channel ridges 54 and side channel ridges 32 are attached between the bottom side 28 of heating surface 24 and the top side 46 of retainer plate 44. A skilled artisan will understand that any method of permanent attachment which does not impair heat distribution to the top side 26 of heating surface 24 can be utilized, such as conventional welding. If welding is used for attachment, the contact points of side channel ridges 32 to the bottom side 28 of heating surface 24 are further sealed with a suitable sealant such as a vulcanizing compound, which seals the perimeter of heat exchange fluid area 52. If present in platen 20, the channel ridges 54 welded to the bottom side 28 of heating surface 24 may also be sealed with a suitable sealant to the bottom side 28 of heating surface 24 and top side 46 of retainer plate 44. However, sealing the channel ridges 54 is an optional feature of the platen 20.

Referring to FIG. 3, channel ridges 54 are attached on the bottom side 28 of heating surface 24, parallel to side channel ridges 32 running the length L of platen 20. As particularly illustrated in FIG. 3, four channel ridges 54 are configured parallel to side channel ridges 32 in platen 20. However, a skilled artisan will understand that only side channel ridges 32 are necessary to define in part heat exchange fluid area 52. Heat exchange fluid area 52 can be partitioned into two or more flow channels 56 with a number of channel ridges 54. It should be noted that the use of channel ridges 54 within heat exchange fluid area 52 provides structural rigidity to platen 20 when used in heating and/or pressing operations.

Referring to FIGS. 1, 2, 4 and 5, retainer plate 44 of platen 20 is rectangular in shape with a length L and width W. Retainer plate 44 comprises top side 46, bottom side 48 and edge 50. The retainer plate 44 abuts the bottom side of side channel ridges 32, end plates 36,36' and, if utilized, the channel ridges 54 located within heat exchange fluid area 52. Retainer plate 44 is made from any suitable material known to those skilled in the art, including stainless steel. The top side 46 of retainer plate 44 facing heat exchange fluid area 52 can be ribbed for improvement of its heat exchange qualities. The channel ridges 54 and side channel ridges 32,32' are attached to the top side 46 of retainer plate 44. Attachment may be achieved by welding channel ridges 54 and by optionally sealing the welded juncture with a suitable sealant to prevent leakage. The bottom side 48 of the retainer plate 44 opposes the top side 46 to which the channel ridges 54 are affixed.

Referring to FIGS. 2, 4 and 5, heat exchange fluid area 52 is defined by the bottom side 28 of the heating surface 24, inner sides 34,34' of the side channel ridges 32,32', the top side 46 of retainer plate 44 and end plates 36,36'. Heat exchange fluid area 52 may be partitioned by channel ridges 54 into multiple sub-compartments called flow channels 56. As illustrated particularly in FIGS. 2, 4 and 5, heat exchange fluid area 52 is partitioned by five channel ridges 54 along length L of heat exchange fluid area 52 into six flow channels 56. However, the heat exchange fluid area 52 can be devoid of channel ridges 54.

Referring to FIGS. 1 through 5, heating elements 58 of platen 20 are positioned adjacent the bottom side 48 of retainer plate 44. The heating elements 58 are separated from the heat exchange fluid area 52 by the retainer plate 44. The bottom side 48 of the retainer plate 44 includes recessed areas adapted to receive heating elements 58. The heating elements 58 are suitable conductive or electric heat devices known by skilled artisans as capable of providing a suitable amount of heat to heat the heating surface 24. However, any type of suitable heating element may be utilized. It is intended that at least one heating element 58 is provided in accordance with the invention. Particularly, as shown in FIG. 3, four heating elements 58 are located on either side of the centermost channel ridge 54. The heating elements 58 are preferably located at approximately forty-five degree angles to the centermost channel ridge 54 and are equally spaced in relation to the surface area of retainer plate 44 for maximum heat distribution.

Multiple and evenly spaced heating elements 58 provide uniform heating of any heat exchange fluid passing through heat exchange fluid area 52. FIG. 3 illustrates utilization of eight heating elements 58. However, the number and specific location of heating elements 58 is not critical to the invention. Alternatively, properly constructed heating elements 58 can be positioned inside the heat exchange fluid area 52 for direct contact with the heat exchange fluid.

Referring to FIGS. 1 through 3, heating element back plate 60 of platen 20 is positioned adjacent the bottom side of heating elements 58 and bottom side 48 of retainer plate 44. Heating element back plate 60 has a rectangular shape with a width W and a length L. Heating element back plate 60 is made from any suitable material known to a skilled artisan, including stainless steel. With heating elements 58 positioned in recesses provided by or even against the retainer plate 44, the non-recessed portion of retainer plate 44 is in direct contact with heating element back plate 60. The heating elements 58 are held in place by the pressure between retainer plate 44 and heating element back plate 60. When heating elements 58 are provided within the flow channels 56, the heating element back plate 60, if present, is adhered directly to the bottom side 48 of retainer plate 44.

Referring to FIGS. 1, 2, 4 and 5, a layer of insulation 62 is adhered to the bottom side 61 of heating element back plate 60 of platen 20. Any type of insulation capable of minimizing heat loss from the heat exchange fluid area 52 is suitable for use. Rectangular shaped bottom plate 64 with length L and width W is positioned below the layer of insulation 62 to hold it in place. Bottom plate 64 is made from a suitable material known to those skilled in the art, including stainless steel.

Figure 3A:
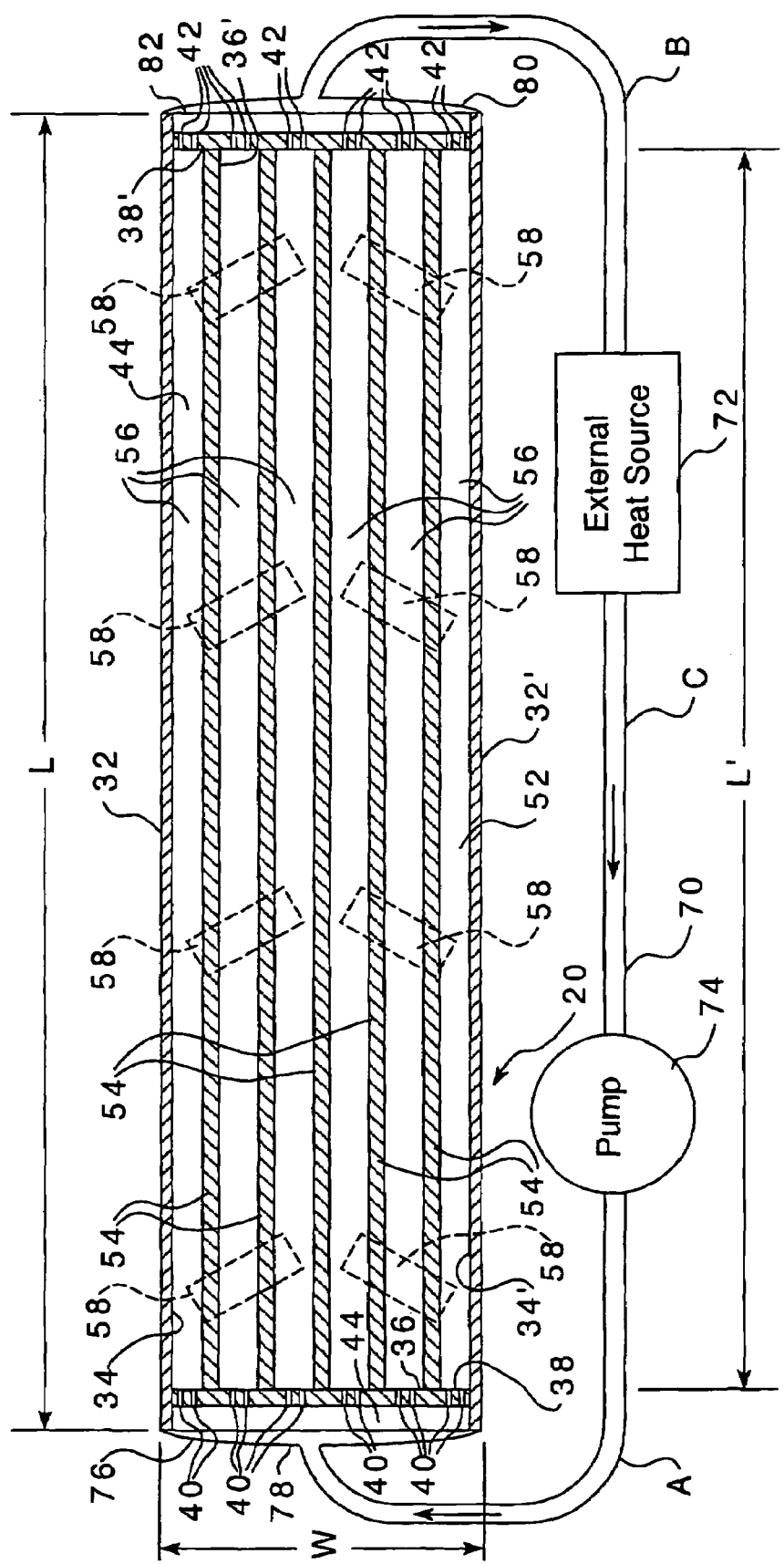
FIG. 3a shows a sectional top view of the platen of FIG. 1 with a flow through system.

Referring to FIGS. 2, 3a and 5, a flow through system 70 is illustrated that provides fluid communication of a heat exchange fluid through platen 20. The flow through system 70 comprises an external heat source 72, a pump 74, an entry manifold 76, an exit manifold 80 and connecting pipes, all of which create a closed system when configured with the platen 20. A suitable entry manifold 76 and exit manifold 80 are known by skilled artisans. The entry manifold 76 is cupped and defines an entry chamber 78 when attached to the upstream end of platen 20. The exit manifold 80 is cupped and defines an exit chamber 82 when attached to the downstream end of platen 20. The entry manifold 76 and the exit manifold 80 are attached with seals to the platen 20 with a liquid tight seal. Tube A is provided for fluid communication between the pump 74 and the entry manifold 76. Tube B is provided for fluid communication between the exit manifold 80 and the external heat source 72. Tube C is provided for fluid communication between the external heat source 72 and the pump 74. Optionally, a cooling mechanism (not shown) is provided in fluid communication with flow through system 70. The flow through system 70 is filled to near capacity with a suitable heat exchange fluid or vapor. Oil can be used as the heat exchange fluid. However, water, steam or any other suitable liquid known by one skilled in the art may be used. In operation, the flow through system 70 provides a continuous flow of a heat exchange fluid into, through and out of the heat exchange fluid area 52 of the platen 20.

Referring to FIG. 3a, the pump 74 of the flow through system 70 circulates the heat exchange liquid or fluid through the platen 20 when in use for pressing and/or drying an item. The heat exchange fluid is primarily heated by the heating elements 58 in the platen 20. Further supplemental heating is provided by the external heat source 72. Heat exchange fluid is pumped through tube A into the entry chamber 78 of entry manifold 76 and is redirected through entry holes 40 of the upstream end plate 36 into heat exchange fluid area 52 optionally partitioned into the flow channels 56. Once in the heat exchange fluid area 52, the temperature of the heat exchange fluid is raised to a desired range and maintained by heat originating from the heating elements 58, whether positioned within or adjacent to the heat exchange fluid area 52. During heating in the heat exchange fluid area 52, the heat exchange fluid flows toward downstream end plate 36' and through the exit holes 42 of the end plate 36' and into the exit chamber 82 of the exit manifold 80. The heat exchange fluid then flows through tube B into the external heat source 72 for supplemental heating and is returned to the pump 74 by tube C to repeat the flow cycle. The pump 74 circulates oil or other heat exchange fluid or vapor through heat exchange fluid area 52 optionally partitioned into flow channels 56 at a pressure of less than 20 psi.

Optionally, the heat exchange fluid may be cooled (not shown) prior to flowing back into the heat exchange fluid area 52 of the platen 20. Cooling the heat exchange fluid may be used in combination with heating the heat exchange fluid to provide varied, but controlled, temperatures at the heating surface 24 of the platen 20. The external heat source 72 may include a cooling mechanism capable of cooling the heat exchange fluid before the heat exchange fluid is pumped into the platen 20. Alternatively, a cooling mechanism is provided as a separate component of the flow system 70. The cooling mechanism is capable of quickly cooling the heat exchange fluid to a desired temperature. The heat exchange fluid when cooled will function to cool the heating surface 24 of the platen 20 to an even and consistent temperature. A suitable fluid cooling mechanism will be known to a skilled artisan.

Figure 3B:
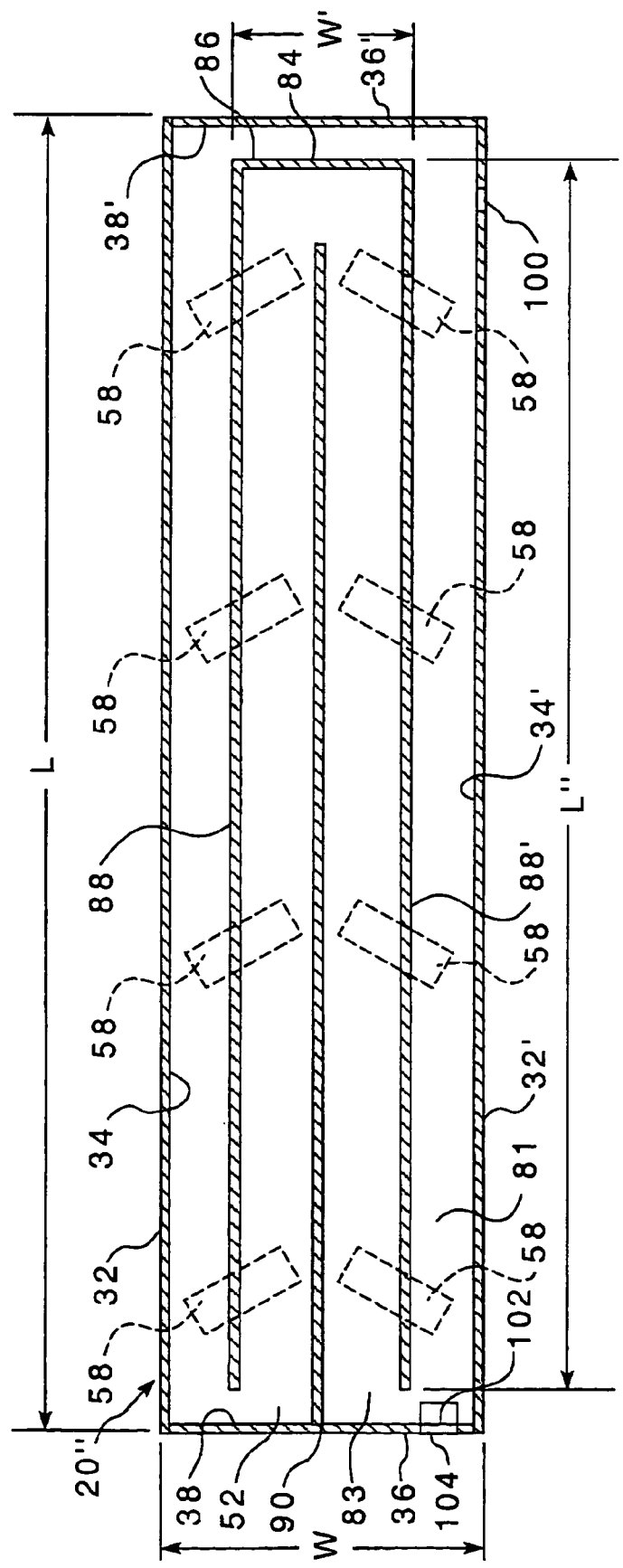
FIG. 3b shows a sectional top view of a platen with an internal circulating flow system.
Figure 3C:
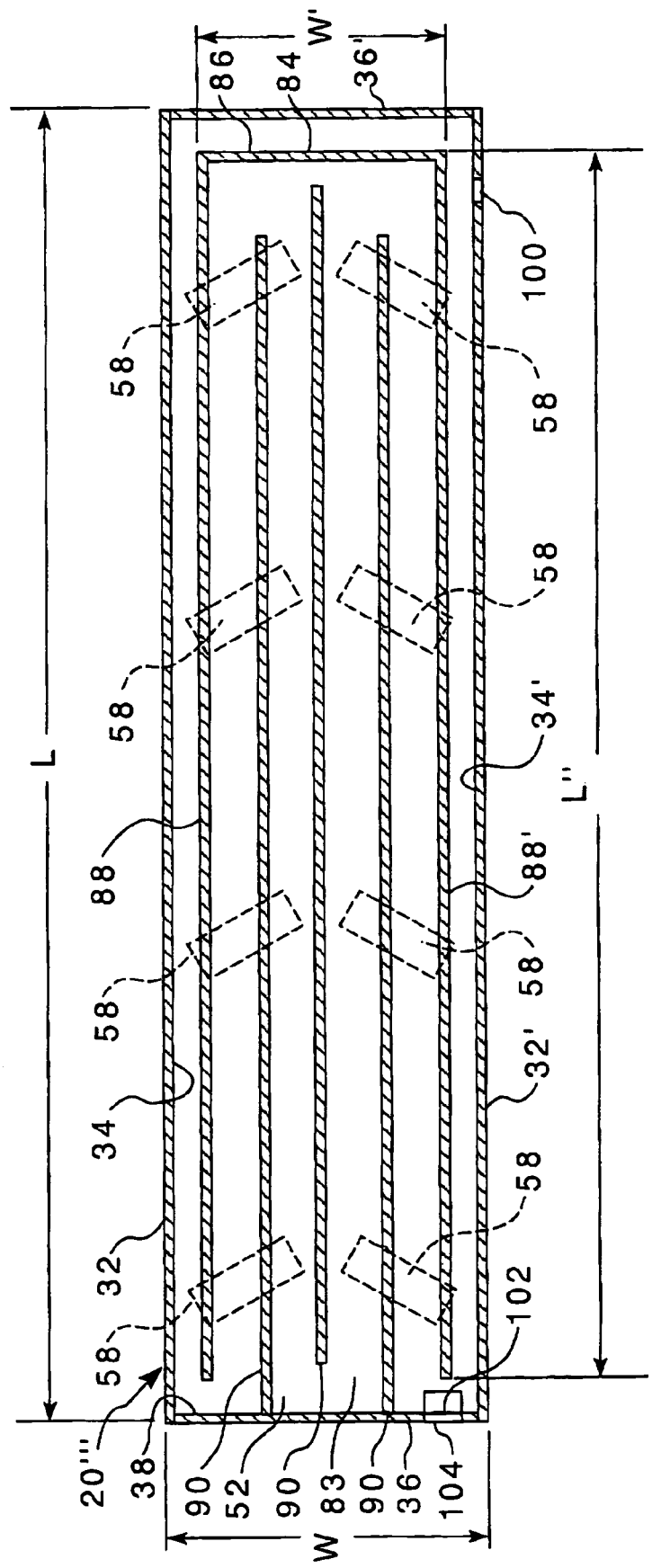
FIG. 3c shows a sectional top view of a platen with an alternative embodiment of an internal circulating flow system.

In alternative embodiments illustrated in FIGS. 3b and 3c, platens 20",20''' are configured with circulating flow system 81 with a continuous fluid flow channel 83 in a self-contained, closed unit. The flow path of the continuous fluid flow channel 83 is defined by inner sides 34,34' of side channel ridges 32,32', u-shaped channel ridge 84, at least one internal channel ridge 90 and inner sides 38,38' of end plates 36,36' attached to the heat surface 24 and retainer plate 44. As shown particularly in FIGS. 3b and 3c, unshaped channel ridge 84 comprises a transverse side 86 with a width W' shorter than the width W of end plates 36,36' and channel arms 88,88' with a length L" shorter than length L of side channel ridges 32,32'. At least one internal channel ridge 90 is provided also with a length L". As illustrated in FIG. 3b, one internal channel ridge 90 is positioned in the heat exchange fluid area 52 and functions with u-shaped channel ridge 84 to direct heat exchange liquid through the continuous fluid flow channel 82 of platen 20". Alternatively, as illustrated in FIG. 3c, three internal channel ridges 90,90',90" are positioned in a staggered formation in the heat exchange fluid area 52 and function with u-shaped channel ridge 84 to direct heat exchange fluid through the continuous fluid flow channel 82 of platen 20'''.

Referring to FIGS. 3b and 3c, the u-shaped channel ridge 84 and internal channel ridges 90 are attached to the heat surface 24 and the retainer plate 44 and are optionally sealed with a sealant. In an embodiment, the side channel ridges 32,32' and the end plates 36,36' are attached by welding to the retainer plate 44. As illustrated by FIGS. 3b and 3c, an access hole 100 of platens 20",20''' provides a communication to fill the platens 20",20''' with a suitable heat exchange fluid and also for drainage. The platens 20",20''' are fitted with an internal pump 102 for circulating the heat exchange fluid through the continuous fluid flow channel 82 of the heat exchange fluid area 52 of the platens 20",20'''. The pump 102 can be positioned inside platens 20",20''' through a sealed pump access port 104 provided in any external structural component of platens 20",20'''. The access port 104 allows for maintenance to and replacement of the pump 102 when necessary. In accord with the invention, the heat exchange fluid is circulated through the continuous fluid flow channel 82 of the heat exchange fluid area 52 by the pump 102 and maintained at a desired temperature by heating elements 58.

In accordance with the invention and as previously discussed, a method of heating a surface of a platen for treatment of a material is provided. Generally, the method comprises the steps of providing any of the embodiments of platens 20,20', 20" with a heat exchange fluid area 52 filled with a fluid adjacent the surface 24 of the platens, flowing the heat exchange fluid through the heat exchange fluid area 52 of a platen 20,20',20" with a flow system of the invention having a pump that corresponds with the selected platen, and heating the fluid flowing through the platen 20,20',20" with at least one heating element 58 within the platen. Optionally, the method includes the step of cooling the heated heat exchange fluid to a desired temperature with an external cooling mechanism prior to circulation through the heat exchange fluid area 52. The step of cooling the heat exchange fluid includes turning off heating elements 58.

Unlike the prior art systems, the oil or other heat exchange fluid or vapor is continuously heated as it slowly flows through the heat exchange fluid area 52 of the embodiments of the platens 20,20',20" of the present invention. The heat provided by the heating elements 58 conducts through the heat exchange liquid to the heat surface 24 to maintain a relatively consistent temperature on the heat surface 24. Accordingly, the heating elements 58 of the present invention overcome problems in the prior art of the temperature gradient caused by heat exchange fluid cooling in its travel through the platen and hot spots on the heat surface. Optionally, the heated heat exchange fluid may also be cooled during use of platen 20 in heating and pressing operations.

The invention claimed is:

1. A heating apparatus comprising a heating surface adjacent a heat exchange fluid area filled with a fluid, the heat exchange fluid area defined by the heating surface attached by a first side wall, a second side wall, a first end plate and a second end plate to a retainer plate, a plurality of heating elements located within recessed areas provided on the retainer plate, and a flow system to move a heated fluid in the heat exchange fluid area, wherein a plurality of internal walls longitudinally partition the heat exchange fluid area into a plurality of flow channels of the heat exchange fluid area of the heating apparatus, the plurality of flow channels each having a rectangular cross-section, wherein the flow system comprises a first manifold in communication with the first end plate having a plurality of holes in communication with the heat exchange fluid area, the plurality of holes positioned such that at least one of the plurality of holes is in communication with each of the plurality of flow channels, a second manifold in communication with a second end plate having a plurality of holes in communication with the heat exchange fluid area, the plurality of holes positioned such that at least one of the plurality of holes is in communication with each of the plurality of flow channels, the first manifold and the second manifold are in fluid communication with a pump and a heating source, and wherein the plurality of heating elements are located on either side of a centermost one of the plurality of internal walls, are located at about forty-five degree angles to the centermost one of the plurality of internal walls and are equally spaced in relation to the surface area of the retainer plate.

2. The heating apparatus of claim 1, wherein the heating source comprises a cooling mechanism capable of cooling the heat exchange fluid.

3. The heating apparatus of claim 1, wherein an external cooling mechanism is provided in fluid communication with the flow system.

4. A platen for drying and pressing a material comprising a heating surface adjacent a heat exchange fluid area filled with a heated fluid, a flow system to move the heated fluid within the heat exchange fluid area, and a plurality of heating elements located within the platen, wherein the heat exchange fluid area is defined by the heating surface attached by a first side wall, a second side wall, a first end plate and a second end plate to a retainer plate and at least one internal wall partitions the heat exchange fluid area into at least two flow channels of the heat exchange fluid area of the platen, the at least two flow channels having a rectangular cross-section, wherein a u-shaped wall and a centermost internal wall positioned between a first side wall and a second side wall of the u-shaped wall create a circulating flow channel to direct heat exchange fluid flow through the heat exchange fluid area of the platen, wherein the flow system comprises a pump positioned within the circulating flow channel of the heat exchange fluid area of platen through a sealed access port provided in one of the first side wall, the second side wall, a first end plate and a second end plate, and wherein the plurality of heating elements are located on either side of the centermost internal wall, are located at about forty-five degree angles to the centermost internal wall and are equally spaced in relation to the surface area of the retainer plate.

5. A method of heating a surface of a platen for treatment of a material, the method comprising the steps of:

providing a platen with a heat exchange fluid area filled with a fluid adjacent the surface of the platen, the heat exchange fluid area defined by a heating surface of the platen attached by a first side wall, a second side wall, a first end plate and a second end plate to a retainer plate;

flowing the fluid through the heat exchange fluid area of the platen with a flow system; and heating the fluid flowing through the platen with a plurality of heating elements within the platen, wherein the flow system comprises a pump within the heat exchange fluid area of the platen and a circulating flow channel configured by a u-shaped wall and a centermost internal wall positioned between a first side wall and a second side wall of the u-shaped wall, the flow channel configured to direct circulating flow of the fluid, and wherein the plurality of heating elements are located on either side of the centermost internal wall, are located at about forty-five degree angles to the centermost internal wall and are equally spaced in relation to the surface area of the retainer plate.

6. The method of claim 5, comprising the further step of cooling the fluid with a cooling mechanism in fluid communication with a flow system.

7. The method of claim 5, wherein the heat exchange fluid area of the platen is an internal space defined by a top plate connected by a first side wall, a second side wall, a first end wall and a second end wall to a bottom plate.

* * * * *